Patented July 29, 1947

2,424,811

UNITED STATES PATENT OFFICE 2,424,811

HOMOGENEOUS FLAKED CATALYST COMPOSITION AND ITS PREPARATION

Meyer L. Freed, Ansonia, Conn., assignor to The Seymour Manufacturing Co., Seymour, Conn.

No Drawing. Application June 16, 1941, Serial No. 398,303

4 Claims. (Cl. 252—245)

This invention relates to the flake form of catalytically active compositions comprising an inorganic constituent dispersed in a solidified oleaginous substance as a protective medium and is particularly concerned with the flake form of hydrogenation catalyst comprising for example, reduced nickel dispersed in a solidified oleaginous substance such as a solidified vegetable oil as cottonseed oil, as a protective medium.

In the hardening of oils, such as vegetable oils, by catalytical hydrogenation, it is customary to use a catalyst comprising, for example, reduced nickel dispersed in an oil, usually a quantity of the same oil which is to be catalytically hydrogenated by the application of the nickel catalyst. Ordinarily, the catalyst is prepared by reducing a nickel salt in the oil, the oil then acting as a protective medium to prevent contact between the reduced nickel and the air and thereby avoiding oxidation of the nickel.

It has been customary to put up such catalytic material for shipment by running the hot liquid suspension of the reduced nickel dispersed in the oil from the reducers (at a temperature of about 350° F.) into steel drums of fifty gallons capacity and permitting the mixture to cool and solidify in the drums. Because of this practice, such product could be shipped solely in steel drums.

Since such catalytic material is sold on the basis of its reduced nickel content, a customary method of its determination has been to withdraw a sample of the suspension shortly after the start of the run of the suspension into the drum, then to take a second sample when the drum was about half full and to take a third sample when the drum was about completely full, and then to put the three samples together and to melt them to permit their intimate mixture and to analyze the mixed sample. The result was considered to represent the analysis of the drum. This procedure was repeated for each drum.

However, since these samples were taken from the suspension while it was in the liquid state and still very hot, such analysis was of no benefit to the customer in preparing to use the material in actual hydrogenation because experience has shown that the solidified product is not homogeneous in composition throughout the drum. This results from the fact that during the cooling of the liquid suspension which has been run into the drum, the heavy nickel particles tend to settle to varying extents within the oil so that in the finally solidified composition, the nickel content varies throughout the drum, in that it actually increases with regularity from the lowest percentage at the top of the drum to the highest at the bottom.

Consequently, the user of such catalytic composition, also experienced serious disadvantages with it. To check the analysis of the product in the delivered drum, it was necessary for the customer to break open practically the entire drum and to chop out samples from several points and to melt them together for a combined sample from which the final analysis was made. Then it has been found that at the plants in preparing to use the material in hydrogenation, the practice has necessarily been to chop out of the drum an approximated amount of the suspension and to melt it and sample it for analysis to be able to determine that a sufficient amount of catalytic nickel was being taken for the treatment of the particular batch of oil to be hydrogenated. The requisite amount of the catalytic composition could be added to the batch of oil to be hydrogenated only after the composition was preliminarily melted, or, in some cases, after it was ground to a fine state, otherwise proper mixture with the oil to be hydrogenated was not to be expected.

Also in this particular practice, further annoyance was experienced because the catalytic composition was not consistent in hardness and varied with the different oleaginous substances, such as the various vegetable or animal oils, used as protective medium. For example, when cottonseed oil was employed as a protective medium, the catalytic composition solidified to a very hard and brittle state. With cocoanut oil mixtures as the medium, the common experience has been that the catalytic composition was rarely hard enough and even with it hardened to an extremely low iodine number, the composition was still not quite hard enough. When fish oil was used as a protective medium, the finished catalytic composition varied from, at times, a soft wax-like character to, at other times, a very hard, brittle type. Not infrequently, the composition was found to be so hard that the customer found it necessary to return the material to the supplier for the latter to chop up the mass and grind it to a fine state.

These inconsistencies in the analysis and the degree of hardness of the catalytically active composition heretofore handled as a large, bulky, heavy, solid mass in steel drums of, for example, fifty gallons capacity, without emphasizing the hazard of having such large volume of the composition cooling from around 350° F. in a considerable number of open top drums, have caused not only the manufacturer, but also the user many difficulties and troubles. Regularly the handling of the catalytic composition in that form has been to both the manufacturer and the user an inconvenient, tedious, annoying and costly affair accompanied with considerable indefiniteness in attaining the desired end.

The instant invention not only overcomes these difficulties, but also contributes other advantages disclosed in the following description.

This invention presents a catalytically active composition, particularly a hydrogenation catalyzation composition, comprising a catalytically active inorganic constituent, especially such constituent of metallic origin, and more especially, for example, nickel in catalytically active state, dispersed in a solidified oleaginous substance as a protective medium, said composition of the catalytically active constituent dispersed in the oil being in the form of flakes.

The product of the invention is prepared by running the hot suspension of the reduced nickel dispersed in the oil from the reducer to a cooling tank equipped with an agitator to keep the suspension in constant motion to maintain the homogeneity of its composition, and also equipped with heat exchange coils through which the temperature of the suspension is controlled at around 260° F., for example, from which tank the uniform suspension is distributed along an element of the chilled rotating roll of a flaking machine, the roll being cooled, for example, with water at about 65° F., the solidified catalytic composition being removed from the roll and broken by a doctor along another element of the roll.

In general, the flake product of the invention is of fairly uniform thickness and of a substantially hardened waxy nature and of uniform composition, the flake production in individual batches being regularly homogeneous. It can be packed in any desirable package, such as bags, boxes, hard fibre containers, barrels, and drums, etc., and can be stored in suitable bins with hopper bottoms if desired.

The flakes flow readily and, consequently, allow considerable simplicity, ease and convenience in handling, not only to the manufacturer in storing and packaging the product, but also to the customer in storing and in adding the catalytic material to the batch of oil to be hydrogenated. The small size of the flakes permits their direct addition and uniform distribution in the batch and eliminates the previously necessary premelting before addition to the batch. The homogeneity in composition of the flakes presents to both the manufacturer and customer uniform analysis in any container and batch and avoids all the difficulty and annoyance heretofore experienced in determining the analysis after its production and in checking it by the customer and in arriving at the weight of the material to add to the batch. All that is necessary now is to work from the simply obtained analysis and weigh out the amount of uniform composition flakes to give the total amount of nickel catalyst required for the batch and to add this amount directly to the batch.

While the invention has been exemplified by describing it more specifically with respect to the flake composition comprising reduced nickel catalyst dispersed in a solidified vegetable or animal oil, to which type of composition it is unusually and particularly unexpectedly applicable, it need not be limited thereto.

The catalytically active constituent dispersed in the protective medium may be another base metal of the iron group such as cobalt or iron, or a metal like copper, or a metal of the platinum group such as palladium or platinum, or in some modifications, a base metal such as chromium, manganese, molybdenum, titanium and vanadium, wherever such metals are to be applied as the hydrogenation catalyst in certain required conditions.

These metals, as also in the case of nickel, need not be employed solely in the form of the elemental metal in finely divided form, but may also be employed as the catalytically active constituent in the form of their oxides, carbides, silicides and the like, or if desired as suitable organic salts. Any form of the catalytic ingredient or constituent may be used alone or in admixture with any other form of the same ingredient or of any form of any other suitable metal or metals, which variations are intended in the specification and the appending claims by the language "catalytically active inorganic constituent" and, specifically as to nickel, by "nickel in catalytically active state." When the catalytically active constituent is employed in the form of a suitable organic salt of any of the applicable metals, the term "inorganic" in the claims relates to the metallic element of such salt.

The inorganic catalytically active constituent of the catalytic composition may be dispersed in any solidifiable oleaginous substance compatible with the material in the hydrogenation of which the catalyst is to be used. Such suitable oleaginous substances are capable of hardening upon being spread in a layer over a chilled surface and of breaking into small fragments, after having hardened, upon removal from the surface, for example, as hereinabove described.

Such solidifiable oleaginous substances, for example, may be a vegetable or animal oil, both of which may be generically referred to as an oil of vegetal origin. Suitable vegetable oils are exemplified by cottonseed, cocoanut and corn oil and the like or combinations of the fatty acid glycerides of such oils. The animal oils may be derived from land animals or may be marine oils such as fish oil, whale oil and the like. Other suitable substances may be stearic acid, tallow and the like. The suitable oleaginous substances of the type illustrated need not be used singly. They may be used in any convenient combinations with one another, for example, mixtures of cottonseed and cocoanut oils in varied proportions or cocoanut oil with other suitable oils or other combinations of solidifiable oils.

While the invention has been illustrated by describing certain embodiments thereof, it is understood that suitable substitution of equivalents, modifications and variations may be made therein without departing from the spirit of the invention, the scope of which is recited in the appending claims.

This application is a continuation of my copending application Serial No. 295,333, filed September 16, 1939.

What is claimed is:

1. The method of preparing a solid catalytically active composition in flake form which is of uniformly homogeneous character with respect to the dispersion therein of the ingredients thereof and comprises nickel in catalytically active state dispersed in a solidified oil selected from the group consisting of vegetable oils, animal oils, and mixtures thereof, which method comprises, continuously distributing a liquid suspension comprising said nickel in catalytically active state homogeneously dispersed in said oil in liquid state, over the rotating surface of a chilled drum to harden the composition and removing the hardened composition from said surface thereby breaking the hardened composition into flakes.

2. The method of preparing in solid form and in flakes a catalytically active composition having as its essential constituents finely divided, catalytically active nickel, deleteriously effected by the air, uniformly homogeneously dispersed in, and protected against the deleterious effect of the air on its catalytic activity by, a solidifiable oil selected from the group consisting of vegetable oils, animal oils, and mixtures thereof, which method comprises keeping in motion a liquid suspension comprising said nickel in catalytically active state dispersed in said oil while in a melted and liquid state, to maintain the uniform dispersion of the nickel in the suspension, continuously distributing a substantially uniformly thick layer of said suspension and of flake thickness over a chilled surface to congeal the composition while maintaining the uniform dispersion of the nickel in the solidifying oil, continuously moving freshly distributed suspension on the chilled surface relatively away from the station of distribution of it, and after keeping the cooling congealed suspension in contact with the chilled surface sufficiently long to permit the composition to harden, separating the solidified, hardened composition from the chilled surface thereby causing the composition to break into substantially flat flakes having uniform thickness, due to the fragility of the hardened composition.

3. Readily flowing, uniformly homogeneous, flat, uniformly thick, small flakes of a catalytically active composition containing as its essential ingredients finely divided, catalytically active nickel, ordinarily deleteriously effected by the air, uniformly dispersed in, and protected from the deleterious effect of the air on its catalytic activity by, a solidified oil selected from the group consisting of vegetable oils, animal oils, and mixtures thereof.

4. Readily flowing, uniformly homogeneous, flat, uniformly thick, small flakes of a catalytically active composition containing as its essential ingredients finely divided, catalytically active nickel, ordinarily deleteriously effected by the air, uniformly dispersed in, and protected against the deleterious effect of the air on its catalytic activity by, a solidified, marine animal oil.

MEYER L. FREED.

REFERENCES CITED

The following references are of record in the file of this patent:

UNITED STATES PATENTS

| Number | Name | Date |
|---|---|---|
| 1,223,123 | Sulzberger | Apr. 17, 1917 |
| 2,084,687 | Jesperson | June 22, 1937 |
| 1,740,064 | Boertlein | Dec. 17, 1929 |
| 1,343,833 | Leitch | June 15, 1920 |
| 915,633 | Strickler | Mar. 16, 1909 |
| 1,594,390 | Van Stone | Aug. 3, 1926 |
| 1,911,479 | Strosacker | May 30, 1933 |
| 1,847,583 | Williams | Mar. 1, 1932 |
| 1,817,304 | Foster | Aug. 4, 1931 |
| 1,649,511 | Cox | Nov. 15, 1927 |
| 1,329,322 | Ellis | Jan. 27, 1920 |